United States Patent [19]
Estlick

[11] 3,781,042
[45] Dec. 25, 1973

[54] JOINT HAVING FORCE CONVERTING MEANS

[75] Inventor: Raymond J. Estlick, Winchester, Mass.

[73] Assignee: Raytheon Company, Lexington, Mass.

[22] Filed: Sept. 30, 1970

[21] Appl. No.: 76,844

[52] U.S. Cl. .............................. 285/339, 285/404
[51] Int. Cl. ............................................. F16l 19/06
[58] Field of Search .................... 285/339, 71, 83, 285/403, 404, 421, 214, 341, 330

[56] References Cited
UNITED STATES PATENTS

| | | | |
|---|---|---|---|
| 385,287 | 6/1888 | Story | 285/339 |
| 1,200,798 | 10/1916 | Bennett | 285/71 |
| 1,827,257 | 10/1931 | Parker | 285/339 X |
| 2,991,091 | 7/1961 | DeCenzo | 285/83 |
| 3,148,902 | 9/1964 | Gardner et al. | 285/339 |
| 2,643,901 | 6/1953 | Manoogian | 285/403 |
| 2,793,779 | 5/1957 | Woods | 285/330 X |
| 2,945,704 | 7/1960 | Korn | 285/330 X |
| 3,472,538 | 10/1969 | Vincent et al. | 285/421 X |

Primary Examiner—Dennis L. Taylor
Attorney—Harold A. Murphy and Joseph D. Pannone

[57] ABSTRACT

A joint comprising two parallel walls, one of which has a through hole aligned with a cavity in the other wall, and a fastening device extended through said hole and into said cavity to engage force-converting means whereby one wall is pulled radially toward the other and simultaneously moved parallel thereto.

2 Claims, 9 Drawing Figures

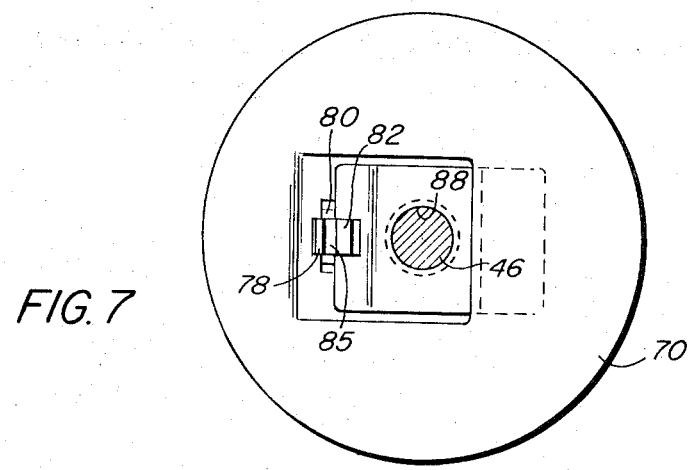
FIG. 7
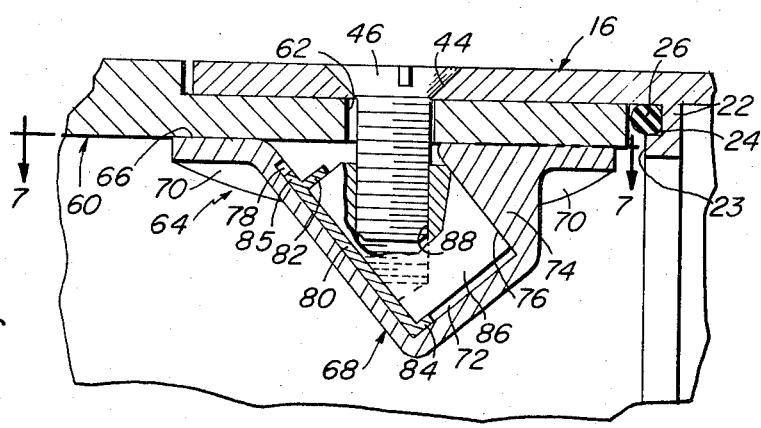
FIG. 6
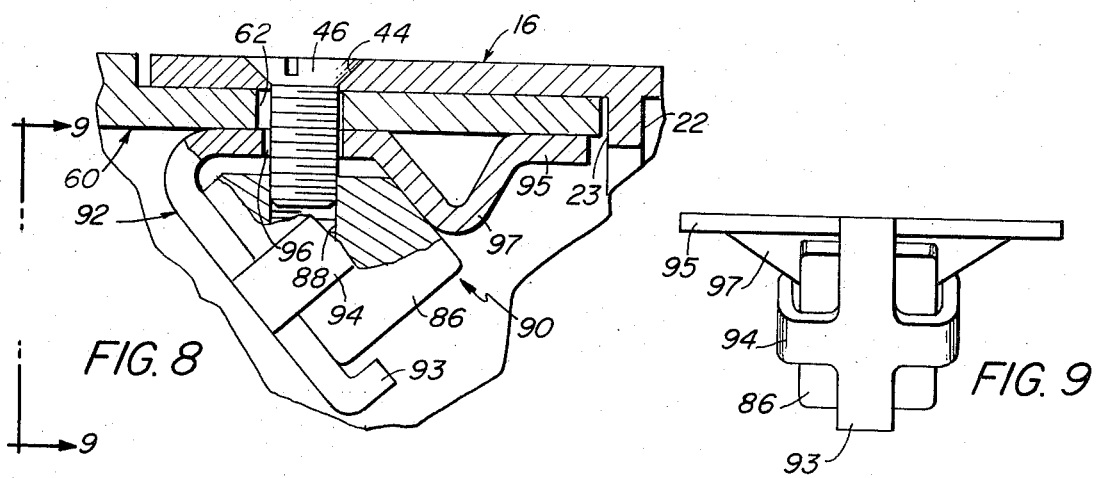
FIG. 8
FIG. 9

JOINT HAVING FORCE CONVERTING MEANS

BACKGROUND OF THE INVENTION

This invention is related, generally, to joint structures and is concerned, more particularly, with a joint for coupling colinear tubular members of streamlined cylindrical bodies.

Generally, colinear tubular members, such as adjacent portions of a pipeline, for example, are joined end to end by means of external or internal annular flanges which extend radially from abutting ends of the members. Each joint comprises a pair of juxtaposed flanges which are coupled to one another usually by bolts extending through respective aligned apertures in the flanges and engaging nuts on the far side. If a flanged joint is to be hermitically sealed, the interfacing flat surfaces of the juxtaposed flanges usually are machined smooth and a flat-faced gasket is positioned therebetween. Consequently, when the coupling bolts and nuts are tightened, the juxtaposed flanges are drawn axially toward one another, and the gasket is compressed annularly therebetween, thereby forming a compact hermetically sealed joint. Thus, the radially flanged joint is structurally rigid and provides full annular compression of the interposed gasket material.

However, in some instances, external radial flanges cannot be used for coupling colinear tubular members. In missile and space applications, for examples, tubular shell portions of streamlined cylindrical vehicles must be jointed end to end in a manner which will minimize aerodynamic drag. On the other hand, the high acceleration forces associated with launching and the severe environmental conditions encountered during flight are two of the many reasons why the body joints of these vehicles must be provided with the structural rigidity and full annular compression characteristics of externally flanged joints. Internal flanges can be coupled as described only when the internally flanged joints are accessible from opposing ends of the resulting tubular structure. Unfortunately, the tubular shell sections of missiles and space vehicles, generally, are preloaded with component parts, such as propulsion and navigational subassemblies, for examples. Therefore, internal radially flanged joints do not provide a feasible means for joining these preloaded shell sections end to end.

Another method commonly employed for joining colinear tubular members comprises having respective male and female end portions of adjoining members slidably engaged in telescoping relationship. In order to seal these telescopic joints, one of the opposing surfaces of each joint, generally, is provided with a respective radial groove wherein there is disposed a resilient "O" ring having an annular portion protruding out of the groove. Accordingly, an annular clearance is provided between the respective male and female end portions to facilitate assembly and to ensure that the interposed protruding portions of the "O" rings will be slidably engaged during telescopic engagement of the end portions and compressed into the associated radial grooves. To achieve the structural rigidity and full annular compression required, threaded portions of angularly spaced screws, generally, are passed through respective radially aligned apertures in the overlapping wall portions of each joint and engage respective nuts or like fastening devices affixed to the inner surfaces of the respective male members. Thus, this method does not require access to the interior of the resulting tubular structure.

However, it has been found that when the radially extending screws of such telescopic joints are tightened, the female wall portions generally buckle or scallop in localized areas around the respective screws. The underlying cause of this distortion is related to the annular clearances provided between the male and female wall portions of the respective joints in order to facilitate assembly and to accommodate the protruding portions of the associated "O" rings. As a result, the female wall portions cannot be compressed circumferentially to meet the concentric male wall portions. Consequently, the respective "O" ring seals are not compressed annularly into the associated radial grooves, and the resulting seals are of questionable value. Furthermore, the radially extending screws of these telescopic joints are required to withstand any axially directed forces acting on the resulting cylindrical structure, such as the acceleration forces associated with launching, for example. Thus, the structural rigidity of these joints is dependent upon the beam strength of the respective radially extending screws and the number of screws used to couple each of the respective joints. Therefore, these telescopic joints do not possess the structural rigidity and full annular compression characteristics of externally flanged joints.

SUMMARY OF THE INVENTION

Accordingly, this invention provides means for coupling colinear tubular members whereby the resulting joints have the structural rigidity and full annular compression characteristics of externally flanged joints. Furthermore, this objective is achieved in a manner which does not require access into the interior of the resulting tubular structure. This inventive means comprises two tubular members having adjoining end portions slidably engaged in telescoping relationship, the female member having an internal annular flange located adjacent the open end of the male member and in axial alignment with an annular portion thereof. The flange is provided with an annular recess facing the open end of the male member and disposed in the recess is a resilient "O" ring having an annular portion protruding from the recess.

An annular series of angularly spaced holes extend through the wall of the female member, adjacent the open end thereof, which holes are radially aligned with respective tapped holes of elongated inserts which are slidably disposed in the wall of the male member and at a oblique angle with the wall of the female member. Thus, a wedge-shaped wall is disposed between each elongated insert and the adjacent wall portion of the female member. Threaded members extend through respective holes in the female member and are journalled into the radially aligned tapped holes of associated inserts. Consequently, the inserts are pulled against the interposed wedge-shaped walls and up the adjacent sloped surfaces thereof whereby bidirectional pressure forces are developed which pull the walls of the male and female members radially toward one another and move the male and the female members axially relative to one another. As a result, the "O" ring is compressed into the supporting annular recess and the associated flange butts against the open end of the male member, thereby providing a hermetically sealed joint having the structural rigidity characteristic of externally flanged joints.

The slidable inserts may be slidably disposed in respective cavities which extend into an internal annular flange of the male member, as shown in one embodiment. Also, the inserts may be slidably disposed in respective housings of captive fastener assemblies, as shown in one alternative embodiment. Furthermore, the inserts may be slidably disposed in respective housings of anchor fastening devices, as shown in another alternative embodiment.

BRIEF DESCRIPTION OF THE DRAWING

For a more complete an understanding of this invention reference is made to the drawings wherein:

FIG. 6 is an enlarged, fragmentary, axial sectional view of an alternative embodiment of the coupling means;

FIG. 7 is a cross-sectional view taken along the line 7—7 of FIG. 6 and looking in the direction of the arrows;

FIG. 8 is an enlarged, fragmentary, axial sectional view of another alternative embodiment of the coupling means; and FIG. 9 is a cross-sectional view taken along the line 9—9 of FIG. 8 and looking in the direction of the arrows.

DESCRIPTION OF THE PREFERRED EMBODIMENT

Figure 1:
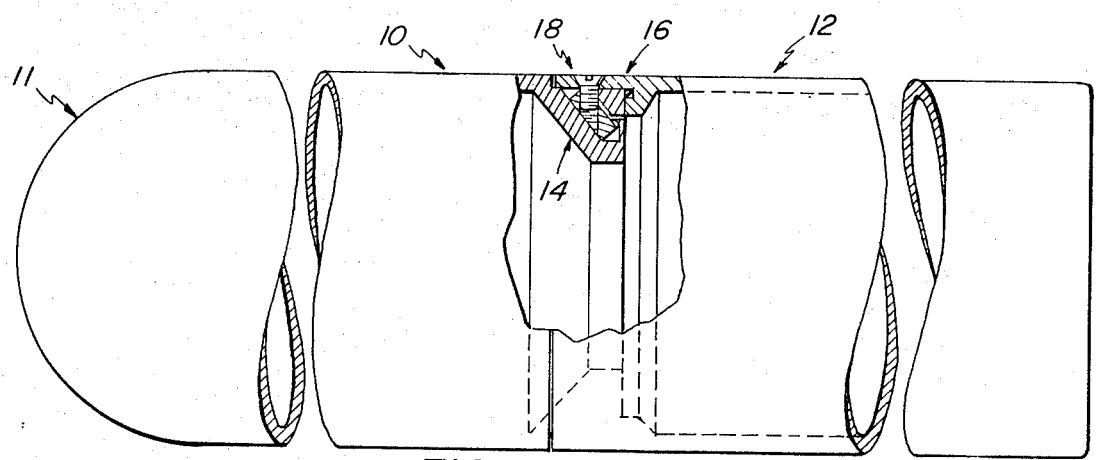
FIG. 1 is a side elevational view, partly in axial section, of s sreamlined cylindrical body embodying the joint structure of this invention.
Figure 2:
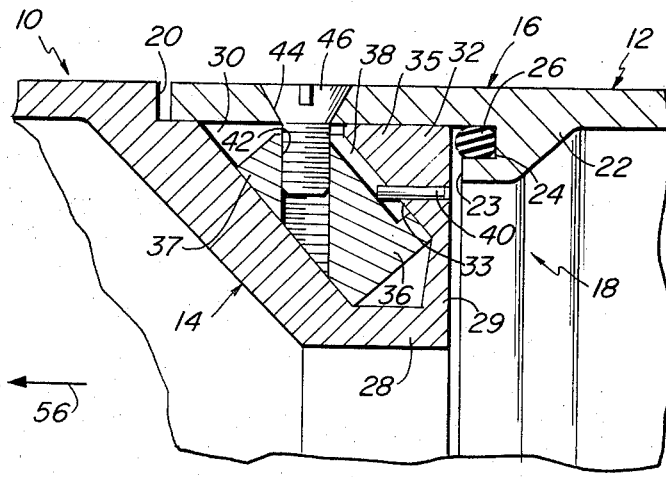
FIG. 2 is an enlarged, fragmentary, axial sectional view of the joint structure just before the hermetical seal is formed.

Referring to the drawing wherein like characters of reference designate like parts throughout the several views, there is shown in FIG. 1 streamlined cylindrical body 11, such as a missile, for example, which includes two colinear tubular members, 10 and 12 respectively, having adjoining end portions, 14 and 16 respectively, slidably engaged in telescoping relationship to form a joint 18 therebetween. As shown more clearly in FIG. 2, end portion 14 which comprises an externally reduced diameter portion of tube 10, constitutes the male member of the joint 18 and the overlapping wall portion 16 of tube 12 constitutes the female member.

The male end portion 14 terminates a predetermined axial distance from the open end thereof in an external annular shoulder 20 formed by the juncture of end portion 14 with the full diameter portion of tube 10. The female end portion 16 terminates a predetermined axial distance from the open end thereof in an internal annular flange 22 which is integrally joined to the cylindrical wall of tube 12 and extends radially inward therefrom. Flange 22 has a flat end surface 23 which is machined smooth and provided with an annular recess 24 of predetermined depth. Installed in recess 24 is an "O" ring 26 of resilient material, such as rubber, for example, and of predetermined thickness such that an annular portion of "O" ring 26 protrudes out of the recess 24.

Figures 3, 4:
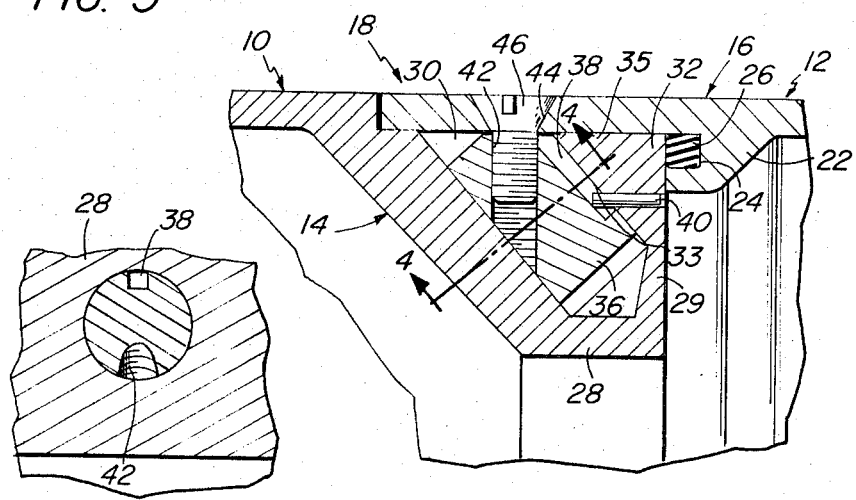
FIG. 3 is an enlarged, fragmentary, axial sectional view of the joint structure after the hermetic seal is formed.
FIG. 4 is a sectional view taken along the line 4—4 of FIG. 3 and looking in the direction of the arrows.

The wall of male portion 14 is thickened on the inner side thereof to provide an annular flange 28 which, preferably, extends a greater radial distance inwardly of tube 10 than flange 22 extends inwardly of tube 12 and has a flat, smooth annular surface 29 which is located normally adjacent and in axial alignment with the "O" ring 26 when the male portion 14 is slidably engaged with the female portion 16. Consequently, when the male member 14 is fully engaged with the female member 16, as shown in FIG. 3, the surface 29 of flange 28 presses the protruding portion of "O" ring 26 into the recess 24 and butts against the surface 23 of flange 22, thereby achieving the full annular compression and structural rigidity characteristics of an internal radially flanged joint. Thus, the joint 18 has the structural features of a telescopic joint and an internally flanged joint. However, it should be noted that in order to have the surface 29 of flange 28 butt against the surface 23 of flange 22 before the open end of female member 16 contacts the external annular shoulder 20, the axial length of the male member 14 must be slightly greater than the axial length of the female member 16.

The flange 28 is provided with an angularly spaced series of cylindrical cavities 30, each having an elliptical opening in the outer peripheral surface of male member 14 and extending into flange 28 at a uniform oblique angle with the longitudinal axis of male member 14. Thus, there is axially disposed between each cavity 30 and the outer peripheral surface of male member 14 a respective wedge-shaped wall 32 having a sloped inner surface 33 which constitutes a longitudinal portion of the wall surrounding the respective cavity and having a tapered thin edge portion which is disposed adjacent the elliptical opening of said cavity. An axially extending keying pin 40 is mounted in the flange 28 opposite each sloped surface 33, the pins extending beyond the surfaces 33 into the cavities 30. In each cavity 30, there is slidably disposed a respective insert 36 which comprises a cylindrical slug of relatively hard rigid material such as steel, for example, and has a predetermined length. Each insert 36 has a longitudinal slot 38 which slidably receives the protruding portion of a respective keying pin 40. Thus, the pins 40 and cooperating slots 38 restrain rotational movement of the respective inserts 36 but permit longitudinal movement in the associated cavities 30.

The inserts 36 lie beyond the plane of the openings in the respective cavities 30 and disposed in the surface of each end portion 37 thereof is an open end of a respective tapped hole 42 which extends into the associated insert 36 at an oblique angle with the longitudinal axis thereof. When oriented by the respective keying pin 40 and cooperating slot 38, the associated tapped hole 42 is disposed substantially perpendicular to the outer peripheral surface of male member 14 and transverse to the longitudinal axis thereof. Thus, it can be seen that the oblique angle formed by the tapped hole 42 with the longitudinal axis of the associated insert 36 is the complement of the oblique angle formed by the associated cavity 30 with the longitudinal axis of male member 14. Radially aligned with each tapped hole 42 is a respective hole 44 in the encircling wall of the female member 16. Machine screws 46 extend radially through the respective holes 44 and into holes 42, thereby threadingly engaging the respective inserts 36.

Figure 5:
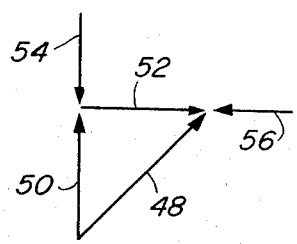
FIG. 5 is a diagrammatic illustration of th forces produced when forming the joint structure of this invention.

When a screw 36 is journalled into a hole 42, the associated insert 36 is pulled against the adjacent sloped surface 33 of the wedge-shaped wall 32. As illustrated in FIG. 5, the pressure exerted by the insert 36 against the wedge-shaped wall 32 may be represented by a force vector 48 which can be resolved into two orthogonally directed force vectors, 50 and 52 respectively. The force vector 50 represents that component of the pressure exerted by insert 36 which is directed radially outward and perpendicular to the overlapping wall portions of the male and female members, 14 and 16 respectively. The force vector 52 represents that component of the pressure exerted by insert 36 which is directed axially toward the open end of male member 14 and parallel to the overlapping wall portions of the male and female members, 14 and 16 respectively. Thus, it can be seen that the respective magnitudes of the axially and radially directed component forces is dependent upon the angle of the slope surface 32.

In response to the radially directed component of the pressure, which is represented by vector 50, the adjacent wall portions of the male member 14 and the female member 16 are drawn radially toward one another, as indicated by the component force vector 50 and the reactive force vector 54. In response to the axially directed component of the pressure, which is represented by vector 52, the adjacent wall portions of the male member 14 and the female member 16 are moved axially relative to one another, as indicated by the component force vector 52 and the reactive force vector 56. The resulting relative radial and simultaneous axial movements of the adjacent wall portions of the male member 14 and the female member 16 permit the tapped hole 42 to travel radially outward along the threaded shaft of the screw 44 thereby drawing the associated insert 36 longitudinally up the adjacent sloped surface 33 while maintaining the pressure against the interposed wedge-shaped wall 32. Thus, the engaged insert and the associated wedge-shaped wall 32 convert the unidirectional tension force exerted by the screw 46 into a bidirectional pressure force.

In practice, the female member 16 is made to slidably engage the male member 14 until the through holes 44 in the female member are radially aligned with respective tapped holes 42 of the inserts 36. At this time, the flat surface 29 of flange 28 may be just contacting the protruding portion of "O" ring 26. The screws 46 are inserted through the holes 44 and journalled incremental distances into the aligned tapped holes 42. Continuous sequential journalling of the respective screws 46 draws the engaged inserts 36 up the associated sloped surfaces 32 and moves the male member 14 and the female member 16 axially relative to one another. However, before any of the inserts 36 can contact the wall of female member 16 or the open end of the female member can bear against the external shoulder 20, the "O" ring 26 is compressed into the recess 24 and the surface 23 of flange 22 butts against the surface 29 of flange 28. Thus, the reason for having each insert 36 a predetermined length is to ensure that when the associated tapped hole 42 is engaged by a respective screw 46, the insert 36 will be spaced the proper distance from the wall of the female member 16, as measured along the associated sloped surface 32.

The radially extending screws 46 serve to hold the walls of the members 14 and 16 radially against one another and to hold the surface 23 of flange 22 against the surface 29 of flange 28. However, the screws 46 are not required to withstand axially directed forces as in conventional telescopic joints. In the joint 18, axially directed forces are resisted by the juxtaposed flanges 22 and 28, respectively. Thus, the joint 18 provides the structural rigidity and full annular compression characteristics of internally flanged joints but does not require access to the interior of the resulting tubular structure in order to couple the juxtaposed flanges 22 and 28. The joint 18 is coupled from the exterior of the resulting tubular structure by means of the radially extending screws 46 developing bidirectional pressure forces which pull the juxtaposed flanges 22 and 28 axially toward one another and which draw the walls of the male and female members radially toward one another.

The heads of the screws 46 are countersunk into the wall of the female member 16 in order to preserve the streamline characteristics of the cylindrical body 11. For the same reason, the open end of the female member 16 is designed to approach the external shoulder 20 as close as possible without bearing against it before the surface 23 of flange 22 butts against the surface 29 of flange 28. Alternatively, a recess, similar to recess 24, for example, could be provided in the annular shoulder 20 and an "O" ring, such as 36, for example, could be disposed in the recess with an annular portion of the "O" ring protruding therefrom. Thus, the open end of female portion 16 would press the protruding portion of the "O" ring into the supporting recess and thereby establish a seal at the open end of the female member 16. If greater torque power is required to move the male and female members axially relative to one another as described, the screws 46 could be replaced by bolts having greater beam strengths and heads which are rotated by socket type wrenches, for example. Also, the inserts 36 need not be supported in a continuous annular flange but may be disposed in respective angularly spaced bosses which may be cast or otherwise affixed to the inner surface of the male member 14. Alternatively, the suggested bosses may be provided in the form of respective captive fastener assemblies, as shown in FIGS. 6-9, for examples.

FIG. 6 shows the female member 16 slidably engaged in telescoping relationship with a male member 60, which is similar to male member 14 except the internal flange 28 is omitted. Axially spaced from the open end of male member 60 is a series of angularly spaced holes 62 which extend through the wall of the male member. Disposed on the inner surface of male member 60, in radial alignment with each hole 62, is a respective captive nut assembly 64. Each captive nut assembly is provided with an arcuately curved surface 66 which conforms to the inner wall of male member 60 and comprises one side of a housing 68 which projects inwardly of the male member. The housing 68 is provided with an annular flange 70 which is securely attached, as by welding, for example, to the adjacent inner surface of male member 60.

Centrally located in the surface 66 of housing 68 is an opening of a cavity 72 which, as shown in FIG. 7, has a rectangular cross-section and extends into the housing 68 at an oblique angle with the surface 66 of the housing. Thus, disposed between the surface 66 and the cavity 72 is a wedge-shaped wall 74 having a sloped inner surface 76 which forms a longitudinal portion of the wall surrounding the cavity 72. Longitudinally disposed in the opposing side of the cavity 72 is a slotted keyway 78 which terminates at one end adjacent the opening of cavity 72. Slidably disposed in the keyway 78 is a generally U-shaped spring clip 80 having upright tabs 82 and 84 which hold a nut 86 therebetween. An extended portion 85 of clip 80 butts against the end of keyway slot 78 adjacent the opening of cavity 72 to retain the nut 86 within the housing 62. The nut 86 is provided with a tapped hole 88 which is disposed perpendicular to the surface 66 of the housing 62 and in radial alignment with the associated hole 62 in male member 60. The machine screws 46 which extend through respective holes 44 in the wall of the female member 16 pass through radially aligned holes 62 in male member 60 and are journalled into respective tapped holes 88. Thus, it is readily apparent that the associated nuts will be pulled against the interposed wedge-shaped walls 74 thereby producing the bidirectional pressure force which will pull the walls of the male and female members radially toward one another and will move the male and female members axially relative to one another.

FIGS. 7 and 8 illustrate how the nut 86 shown in FIG. 6 and 7 may be held and oriented by a stamped metal housing 92 of an anchor nut assembly 90. Housing 92 comprises crossed metal arms, 93 and 94, respectively, which are integrally joined at one end to the base portion of a triangular shaped plate 95. The plate 95 has a hole 96 extending therethrough adjacent the base of the triangle and a V-shaped indentation transversely disposed adjacent the apex of the triangle. The tapped hole 88 of the nut 86 is aligned with the hole 96 in plate 95 and the crossed arms are wrapped loosely around the nut 86 to hold it against the adjacent sloped surface of the indentation 97. The plate 95 is securely attached, as by welding, for example, to the inner surface of male member 60 such that the hole 96 and tapped hole 88 are radially aligned with the associated hole 62 in the male member 60. Thus, the transverse half of indentation 97 adjacent the nut 86 forms the required wedge-shaped wall between the nut 86 and the wall of male member 60. When the associated screw 46 extends through holes 44, 62 and 96 and is journalled into the radially aligned hole 88, the nut 86 is pulled against the adjacent sloped surface of the V-shaped indentation 97 and thereby produces the bidirectional pressure force which will pull the walls of the male and female members radially toward one another and will draw the male and female members axially relative to one another.

Thus, there has been disclosed herein means for coupling colinear tubular portions of streamlined cylindrical bodies whereby the resulting joints provide the structural rigidity and full annular compression characteristics of internally flanged joints but do not require access to the interior of the resulting cylindrical structure. Although the inserts 36 have been shown herein as having circular cross-sections, they may also have other cross-sectional configurations, such as square, for example, provided that the insert is longitudinally slidable along an adjacent sloped surface. Furthermore, this novel structure may be adapted for coupling hollow members having other cross-sectional configurations than the circular one shown herein. For example, elongated hollow sections of air conditioning ducts, which generally, have rectangular cross-sections, may be joined by use of the novel joint structure disclosed herein. Moreover, this invention may be used wherever a fastening device is required to develop bidirectional forces, such as instances where a joint is not accessible from one direction but is accessible from an orthogonal direction, for example.

From the foregoing, it will be apparent that all of the objectives of this invention have been achieved by the structures shown and described. It will be also apparent, however, that various changes may be made by those skilled in the art without departing from the spirit of the invention as expressed in the appended claims. It is to be understood, therefore, that all matter shown and described is to be interpreted as illustrative and not in a limiting sense.

What is claimed is:

1. In combination:

first and second tubular members having respective first and second end portions slidably engaged in telescopic relationship, the first end portion having an inwardly extending flange and the second end portion having an end disposed in axial alignment with the flange;

said first end portion having in the wall thereof a series of spaced radially extending through holes;

said second end portion having in the outer surface thereof a series of spaced openings, each opening being disposed in radial alignment with a respective one of said holes;

a plurality of first fastening devices, each disposed within a respective one of said holes and said radially aligned opening;

a plurality of cooperating second fastening devices, each being disposed within said second end portion, in radial alignment with a respective one of said openings and engaged by a respective first fastening; and means affixed to the internal surfaces of the second end portion for slidably supporting each of said second fastening devices at an oblique angle with the adjacent surface of said first end portion and including therebetween force converting means comprising respective wedge-shaped walls for converting radially directed forces exerted by said first fastening devices into bidirectional forces for moving the first and second end portions axially relative to one another while drawing the walls thereof radially toward one another.

2. A combination as set forth in claim 1 wherein said supporting means comprises a series of spaced housings affixed to the internal surface of said second end portion, each having a cavity therein disposed in radial alignment with a respective one of said openings and at an oblique angle with the adjacent surface of said first end portion and having slidably disposed therein a respective one of said second fastening devices.

* * * * *